United States Patent
Carroll (10) Patent No.: US 6,375,277 B1
(45) Date of Patent: Apr. 23, 2002

(54) MANUAL RELEASE VALVE APPARATUS FOR ECP BRAKE EQUIPMENT

(75) Inventor: John B. Carroll, Irwin, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/849,028

(22) Filed: May 4, 2001

(51) Int. Cl.[7] .................... B60T 15/02; B60T 15/16
(52) U.S. Cl. ...................... 303/68; 303/3; 303/15
(58) Field of Search ..................... 303/75, 72, 68, 303/69, 73, 81, 86, 76, 3, 51, 15–17, 50, 74, 82, 83, 71, 28, 29, 36, 37, 40, 41; 251/30.02, 331; 137/596

(56) References Cited

U.S. PATENT DOCUMENTS

| | | | | |
|---|---|---|---|---|
| 5,083,843 A | * | 1/1992 | Engle | 303/74 |
| 5,333,941 A | * | 8/1994 | Hart et al. | 303/40 |
| 6,238,012 B1 | * | 5/2001 | Santoro, Jr. et al. | 303/51 |

* cited by examiner

Primary Examiner—Douglas C. Butler
(74) Attorney, Agent, or Firm—James Ray & Associates (57) ABSTRACT

A release valve apparatus for use on freight railcars equipped with ECP brake equipment comprises a spool valve assembly and a control valve assembly. The control valve assembly features a lever with which a railroad worker can affect the pressure in a brake cylinder to which the spool valve assembly is connected. By operating the lever after a brake application, a worker can not only manually release the pressure from the brake cylinder but also lock the brake cylinder in a release state until the spool valve assembly is reset. The spool valve assembly can be reset merely by commanding the ECP brake equipment to depressurize a control chamber underneath the spool valve assembly, in response to which the ECP application and release valves are again placed in communication with the brake cylinder. The lever can also be used to manually blow down the auxiliary and emergency reservoirs.

19 Claims, 6 Drawing Sheets

MANUAL RELEASE VALVE APPARATUS FOR ECP BRAKE EQUIPMENT

FIELD OF THE INVENTION

The invention generally relates to manually operated valves that heretofore have been used only on freight railcars equipped with conventional pneumatic brake control valves to vent air from the brake cylinders. More particularly, the invention pertains to a release valve apparatus designed for freight railcars equipped with electrically controlled pneumatic (ECP) brake control valves.

BACKGROUND OF THE INVENTION

The following background information is provided to assist the reader to understand at least one of the many environments in which the invention could be used. The terms used herein are not intended to be limited to any particular narrow interpretation unless expressly stated otherwise in this document.

A freight train typically includes one or more locomotives, a plurality of railcars and several trainlines. For a freight train headed by a locomotive equipped with an ECP brake control system, the trainlines include both pneumatic and electrical lines some of which run from the lead locomotive to the last railcar in the train. A pneumatic trainline known as the brake pipe is one such trainline. It extends the length of the freight train, as does a two-wire electrical trainline known as the ECP trainline. Each locomotive also features a multi-wire electrical trainline known as the multiple unit (MU) line cable. The MU line cable consists of 27 different electrical lines. As is well known in the railroad industry, the MU line cable contains 74V dc power and return lines on which battery power from the locomotive is supplied to the ECP brake equipment on each railcar and to various other power consuming devices on the train.

Figure 1:
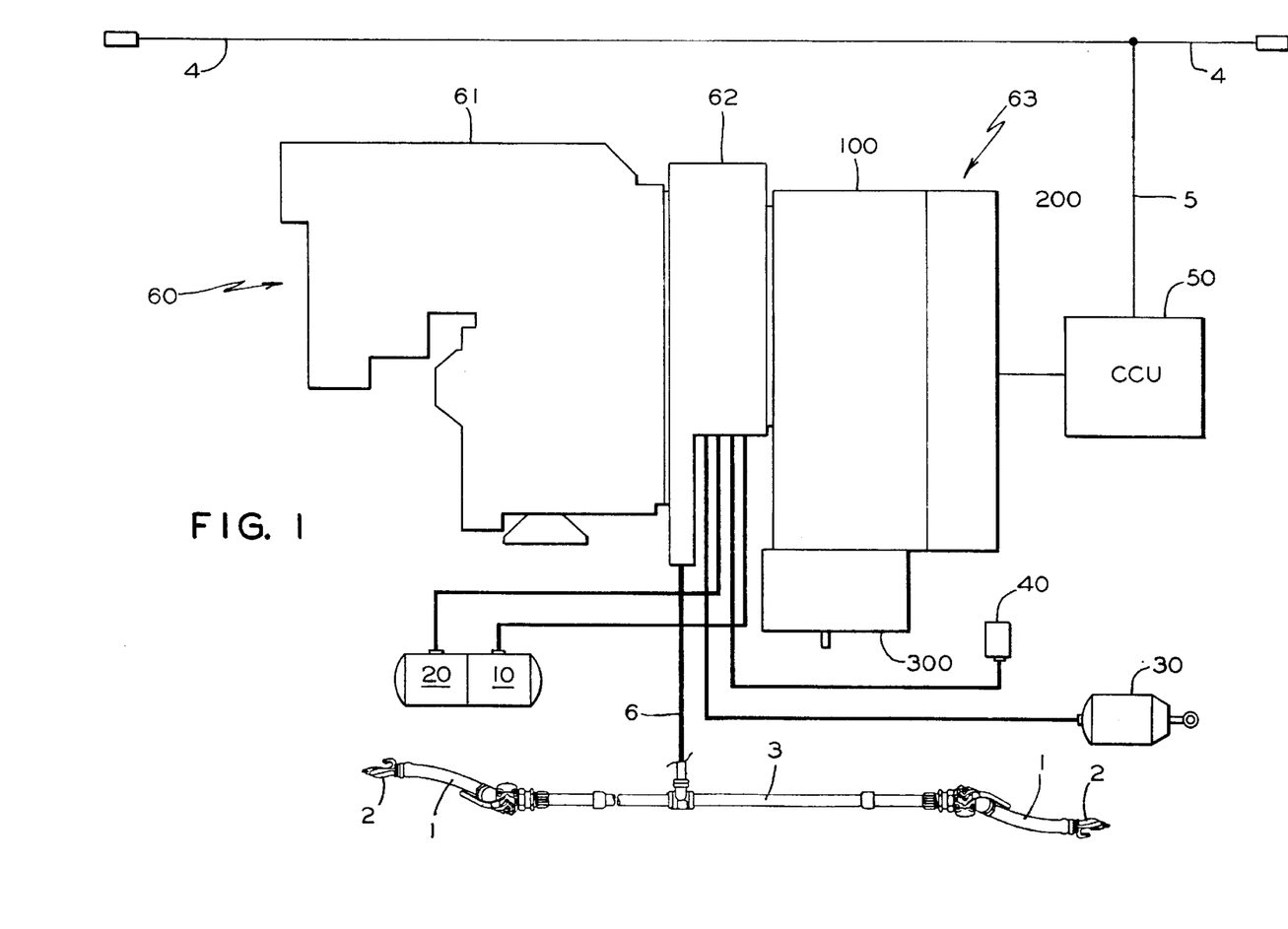
FIG. 1 is a schematic view of the electrically controlled pneumatic (ECP) brake equipment for a railcar of a freight train, including the release valve apparatus of the invention.

The brake pipe consists of a series of pipe lengths, with one pipe length secured to the underside of each railcar. As shown in FIG. 1, each pipe length has, at each of its ends, a flexible hose 1 with a coupler commonly referred to as a glad hand 2. As the locomotives and other rail vehicles are coupled in sequence to form the freight train, the brake pipe 3 is formed by connecting the glad hand 2 at the end of each pipe length to the glad hand 2 of another such pipe length on an adjacent vehicle. Similar to the brake pipe 3, the conduit in which the ECP trainline 4 is housed actually constitutes a series of individual conduits. One such conduit secured to the underside of each vehicle interconnects to another such conduit via a connector between each rail vehicle. Supplied from the 74V dc power line of the MU line cable in the locomotive, the ECP trainline 4 typically operates at a nominal 230V dc to power the ECP brake equipment on each railcar of the freight train.

The ECP brake control system in the locomotive includes a cab station unit and a master controller from which the brakes on the train are ultimately controlled. The cab station unit features one or two handle(s) and/or push buttons that the train operator uses to direct control of the brakes. One such handle, known as the automatic brake handle, can be moved to and between the following positions: release, minimum service, full service, suppression, continuous service, and emergency. Between the minimum and full service positions lies the service zone wherein each incremental movement of the handle toward the full service position causes an even stronger service application of the brakes. The force with which the brakes apply depends on how far towards the full service position the brake handle is moved.

Inputs from the handle(s) and/or push buttons are processed by the cab station unit and then passed to the master controller. Operating according to instructions contained within its programming code, and in response to the inputs from the handle(s) and other sources, the master controller formulates a brake command appropriate to current conditions and transmits it along the ECP trainline 4 to each railcar in the freight train. As specified by the American Association of Railroads (AAR), the brake commands and other ECP messages are transmitted from the locomotive using a powerline communications system such as the Echelon LonWorks System. Along the ECP trainline 4, the brake command(s) are then conveyed to the ECP brake equipment on each railcar via branch wiring 5. Similarly, in a manner known in the railroad industry, the brake pipe 3 connects to the ECP brake equipment on each railcar via a branch pipe 6.

The master controller can thus order, through the brake command, any action from a release of brakes to an emergency application of brakes or any degree of brake application in between those two extremes. The brake equipment may also be designed to provide graduated release of the brakes. The degree of brake application ordered by the master controller is typically conveyed in terms of a percentage of the pressure required for full service brake application. For example, zero percent (0%) is typically designated for a release of brakes, 15% for a minimum service brake application, 100% for a full service brake application and 120% for an emergency brake application.

The ECP brake equipment on each railcar typically includes an auxiliary reservoir 10, an emergency reservoir 20, one or more brake cylinders 30, a retainer valve 40, a car control unit (CCU) 50 and an ECP brake control valve, generally designated 60. The ECP brake control valve 60 includes a pneumatic portion 61 and an electropneumatic portion, generally denoted 63, typically mounted to opposite sides of a pipe bracket 62. The pneumatic portion may take the form of an emergency portion of a brake control valve such as an ABD, ABDX or ABDW type valve made by the Westinghouse Air Brake Technologies Corporation (WABTEC). The electropneumatic portion 63 is comprised of a manifold 100, several pressure transducers, and several solenoid-operated application and release valves. The transducers and solenoid valves are collectively designated by section 200. The manifold 100 defines several ports to which the transducers and solenoid valves connect. It also defines a number of internal passages, which communicate with passages internal to the pipe bracket 62.

Each port of the pipe bracket 62 connects to one of the interconnecting pipes on the railcar such as those leading to the brake pipe 3, the retainer valve 40, the auxiliary reservoir 10, the emergency reservoir 20 and the brake cylinder 30. It is through the internal passages of the pipe bracket 62 that the various portions of the brake equipment communicate fluidly with the pneumatic piping on the railcar. Used to monitor the pressures in the brake pipe 3, the two reservoirs 10 and 20 and the brake cylinder 30, the pressure transducers convey electrical signals indicative of those pressures to the CCU 50.

Each CCU 50 includes a transceiver and a microprocessor. Controlled by the microprocessor, the transceiver is connected via the branch wiring 5 to the ECP trainline 4 from which it receives the brake commands issued by the master controller. The transceiver converts the electrical brake commands into a form usable by the microprocessor. Operating according to its programming code and to the dictates of the brake commands and other electrical signals it has received, the microprocessor controls the application and release valves in a manner well known in the brake control art. It is through the solenoid valves that air can be maintained within, exhausted from, or directed from either or both of the reservoirs to the brake cylinder(s) 30.

By moving the automatic brake handle into service zone, for example, the train operator in the locomotive will cause the ECP brake control system to issue a service brake command along the ECP trainline 4. In response to the service brake command, the microprocessor on each railcar will then energize the application valve(s) for the appropriate time. This enables the appropriate amount of air to flow from the auxiliary reservoir 10 and/or the emergency reservoir 20 via the pipe bracket 62 and the manifold 100 through the application valve(s) ultimately to the brake cylinder 30. Similarly, in response to the brake handle having been moved into the release position, the ECP brake control system will issue a release brake command along the ECP trainline 4. In response to this command, each microprocessor will then energize the release valve(s) on its railcar. Air from the brake cylinder 30 will then flow via the pipe bracket 62 and the manifold 100 through the release valve(s) to atmosphere, thus depressurizing the brake cylinder 30 and releasing the brakes on the railcar.

Figure 2:
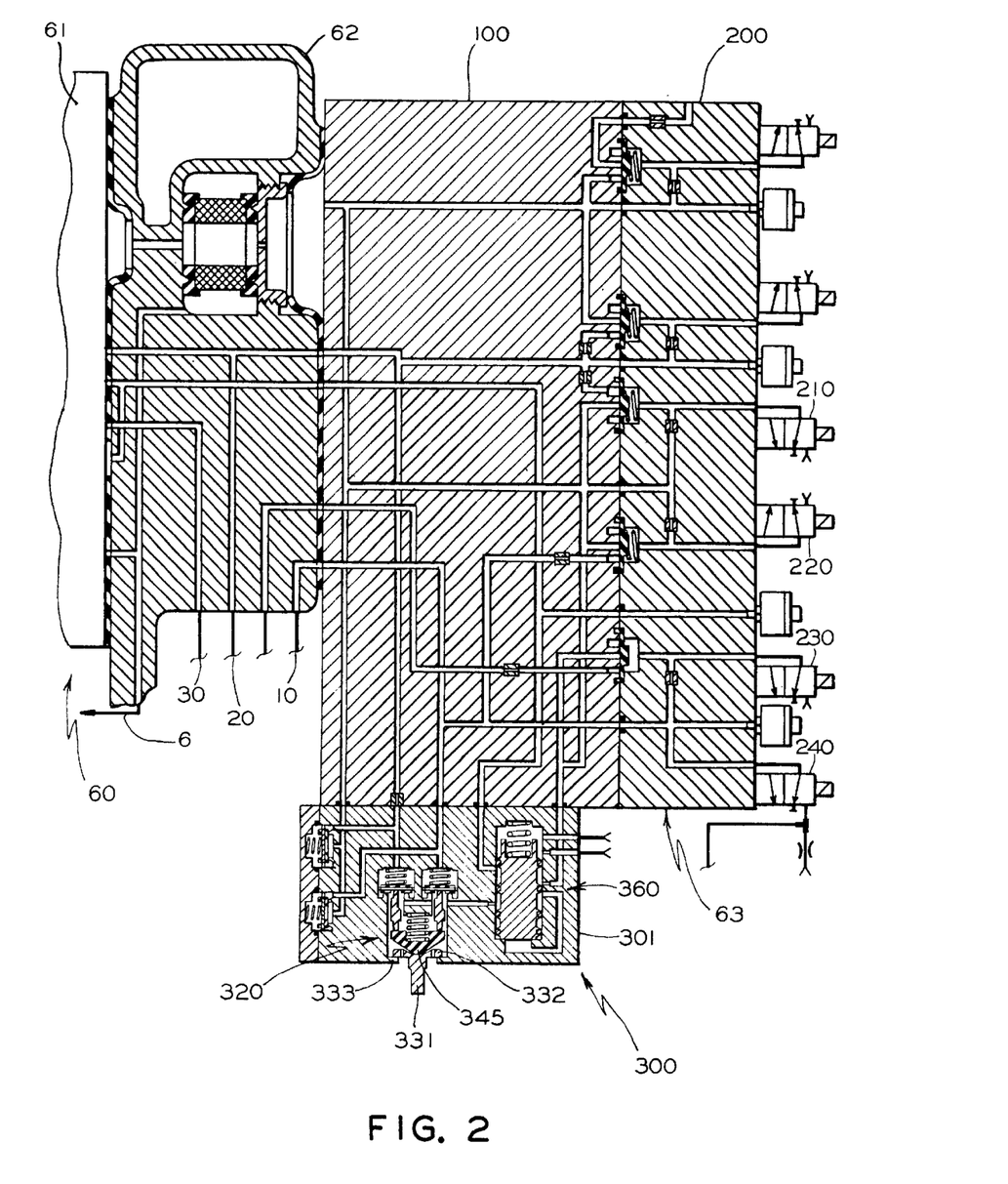
FIG. 2 is an enlarged, cross-sectional view of the ECP brake control valve and the release valve apparatus shown in FIG. 1.

In addition, as a safety measure, emergency brake commands are conveyed to the railcars not only electrically along the ECP trainline 4 but also pneumatically along the brake pipe 3. By moving the handle into the emergency position, the train operator in the locomotive causes the pressure in the brake pipe 3 to drop at an emergency rate. This drop in pressure eventually propagates along the brake pipe 3 to each railcar in the train. Should the CCU 50 and/or the electropneumatic portion 63 lose power or otherwise fail, the emergency portion 61 of brake control valve 60 will still respond pneumatically to the telltale reduction in pressure that occurs in the brake pipe 3 during an emergency. The emergency portion 61 is designed to respond to the emergency pressure drop by supplying pressurized air from both reservoirs 10 and 20 to the brake cylinder 30, and thereby cause an emergency application of the brakes. Absent a command to apply the brakes and under conditions known in the brake control art, the ECP brake equipment through its pneumatic valves 7 and 8 (as shown in FIG. 2) charges the two reservoirs 10 and 20 with pressurized air obtained from the brake pipe 3.

However pressurized, the brake cylinder 30 converts the pressurized air that it receive to mechanical force. This mechanical force is transmitted by mechanical linkage to the brake shoes. Forced against the wheels and/or disc brakes, the brake shoes are used to slow or stop the rotation of the wheels. The magnitude of the braking force applied to the wheels is directly proportional to the pressure built up in the brake cylinder(s) 30.

Before the advent of ECP brake control systems, freight trains were equipped with only conventional pneumatic or electropneumatic brake control systems. ECP brake control systems were initially employed only as an overlay for or an adjunct of the conventional brake control systems. Unlike an ECP brake control system, a conventional control system uses the brake pipe to convey pneumatically from the locomotive to every railcar in the train all brake commands, not just the emergency commands.

In addition to the cab station unit, a conventional brake control system includes a brake control computer (BCC) and a pneumatic operating unit (POU). The BCC responds to the signals output by the cab station unit, i.e., by the handle(s) and/or push buttons. Based on these and other signals and on the software that dictates its operation, the BCC controls the operation of various pneumatically and electropneumatically operated devices that comprise the POU. Comprised mainly of pneumatic logic circuitry and solenoid operated valves, these devices are commonly referred to as operating portions. It is through these operating portions that the BCC actually controls the pressure in the brake pipe (and in various other pneumatic trainlines and reservoirs).

The railcars on such conventionally equipped trains each have ABD, ABDX, ABDW or similar type conventional brake control valves (CBCV). This type of brake control valve has an emergency portion, like the one discussed above, along with a service portion, both mounted to a pipe bracket. Through the ports and internal passages of the pipe bracket, the service and emergency portions of the CBCV communicate fluidly with the pneumatic piping on the railcar, i.e., to the interconnecting pipes leading to the brake pipe, the brake cylinder and the two reservoirs.

The operator in the locomotive of such a conventionally equipped train also controls the brakes through the automatic brake handle. In a conventional system, however, the operator, by moving the handle, controls the pressure level in the brake pipe and thereby directs whether, and to what extent, the brakes will apply. By changing its pressure level, the brake pipe is used to pneumatically convey release, service and emergency brake commands to the CBCV on every railcar. In response to a release brake command (i.e., when brake pipe pressure is restored to its normal operating pressure), the service portion of the CBCV not only charges the two reservoirs with the pressurized air it receives from the brake pipe but also vents the brake cylinder to atmosphere thereby causing the brakes on the railcar to release. In response to a service brake command (i.e., when brake pipe pressure is reduced at a service rate), the service portion supplies air from only the auxiliary reservoir to the brake cylinder to apply the brakes. How much the brake pipe pressure is reduced, and thus the magnitude of the service brake application, depends on how far the automatic brake handle is moved towards the full service position. In response to an emergency brake command (i.e., when the brake pipe is vented to atmosphere at an emergency rate), the service and emergency portions of the CBCV supply air from both reservoirs to the brake cylinder to apply the brakes more quickly and forcefully.

Under the control of a conventional brake control system, the brake pipe (or, more accurately, the pressure level contained within it) determines whether a CBCV will charge its two reservoirs or deliver pressurized air previously stored in one or both of its reservoirs to the brake cylinder. In an ECP brake control system, by contrast, the ECP trainline 4 is the conduit through which the brake equipment on each railcar is controlled.

One major difference between ECP and conventional brake control systems is that only brake control valves designed for the latter have been equipped with a manually operated valve known as a release valve portion. Bolted to the service portion of a conventional brake control valve (CBCV), the release valve portion has typically provided three levels of operation from which a railroad worker can choose. Specifically, it offers a choice between exhausting only the brake cylinder, exhausting the auxiliary reservoir and the brake cylinder, or exhausting both reservoirs and the brake cylinder. An example of such a release valve portion is shown and described in Publication 5062-19 published by WABTEC and incorporated herein by reference.

Such a release valve portion contains certain internal passages, and typically houses a handle valve assembly and a spool valve assembly. The passages are designed to interconnect the various parts and chambers of the handle and spool valve assemblies with specific passages internal to the service portion of the CBCV. By moving the handle of the handle valve assembly, a railroad worker can manually affect the internal operation of the valve assemblies, and in turn control whether and which of the known passages in the service portion will be operatively linked with the passages in the release valve portion.

On ABD, ABDX and ABDW type brake control valves, for example, the extent to which the handle is moved determines the operation of the release valve portion. A temporary pull on the handle compels the release valve portion to rapidly exhaust the brake cylinder to atmosphere through the spool valve assembly, while retaining the air stored in the auxiliary and emergency reservoirs. The brake cylinder will generally stay locked in the release position by the spool valve assembly until the control pressure, provide by the brake pipe, rises to a set level. A sustained partial movement of the handle not only allows the brake cylinder to vent as noted above but also permits the auxiliary reservoir to vent via the handle valve assembly. Moving the handle to its fullest extent likewise compels the release valve portion to vent the brake cylinder, but also permits both reservoirs to vent via the handle valve assembly.

The advent of electronics compelled the development of ECP technology. The performance of ECP technology has enabled the service and emergency braking functions on freight trains to be carried out much faster than was possible with conventional pneumatic technology. This increase in speed is because the brake commands are conveyed to the railcars electrically on the ECP trainline 4 rather than pneumatically via the brake pipe 3. Although it may use the same emergency portion as a conventional brake control valve, the ECP brake control valve has obviated the need for the service portion, which has been succeeded by the electropneumatic portion 63 described above. Operating in conjunction with the CCU 50, the electropneumatic portion 63 is what enables the ECP brake control valve to speedily initiate service and emergency braking on today's modern freight trains.

One shortcoming in the ECP brake control valve, however, is that it lacks a manually operable release valve. This is largely due to the loss of the brake pipe as a carrier of control pressure (service brake commands) and to the configuration of the manifold 100, which has networks of internal passages substantially different from those found in the service portions of conventional brake control valves. Due to the lack of such release valves on railcars equipped with ECP brake equipment, railroad workers are currently unable to easily vent the brake cylinders, either alone or in combination with one or both of the reservoirs.

OBJECTIVES OF THE INVENTION

It is, therefore, an objective of the invention to provide a manually operable release valve apparatus for an ECP brake control valve.

Another objective is to provide a release valve apparatus designed to operate through the internal passages of a manifold of an electropneumatic portion of an ECP brake control valve.

A further objective is to provide a release valve apparatus for an ECP brake control valve that can be used not only to manually release the pressure from a brake cylinder after a brake application but also to lock the brake cylinder in a release state until the release valve apparatus is automatically reset.

Still another objective is to provide a release valve apparatus that can be used to exhaust not only the brake cylinder but also the auxiliary reservoir and/or the emergency reservoir.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the accompanying claims and the attached drawings.

SUMMARY OF THE INVENTION

The foregoing objectives and advantages are attained by a release valve apparatus that permits the pressure within a brake cylinder of a railcar to be released manually. The railcar will typically have at least one reservoir and an electropneumatic valve used in controlling the pressure developed within the brake cylinder. In a basic embodiment, the release valve apparatus comprises a control valve assembly, a spool valve assembly and an enclosure. The enclosure defines a control valve housing and a spool valve housing in which the control and spool valve assemblies are housed, respectively. It also defines at least one supply channel, a brake cylinder passage, an exhaust passage, a brake control passage, a control chamber, a chamber passage and a release passage. The supply channel serves to connect the reservoir with the control valve housing. The brake cylinder passage serves to connect the brake cylinder with the spool valve housing. The exhaust passage communicates the spool valve housing to atmosphere, and the brake control passage serves to connect the electropneumatic valve with the spool valve housing. The control chamber communicates with one end of the spool valve housing, and the chamber passage further links the control chamber with the spool valve housing. The release passage interconnects the control and spool valve housings. The spool valve assembly includes a spool member and a reset spring. The position of the spool member in the spool valve housing dictates whether and which of the passages communicate. Biased by the reset spring to a deactivated position, the spool member therein permits the brake control and the brake cylinder passages to communicate through the spool valve housing. This allows the pressure in the brake cylinder to be controlled via the brake control passage. In the deactivated position, the spool member also connects the chamber and release passages thereby permitting only the control valve assembly to control pressure in the control chamber. The spool member responds to the build up of pressure in the control chamber by moving away from the deactivated position. The spool member first moves to switch the brake control passage from communication with the brake cylinder passage to communication with the chamber passage. By connecting the brake control and chamber passages, the spool member enables pressure to be built in the control chamber via both the brake control and release passages. The continuing pressure buildup in the control chamber then moves the spool member to the released position. When so forced to the released position, the spool member cuts off communication between the release and chamber passages. This causes the pressure in the control chamber to be controlled only through the brake control passage. In the released position, the spool member also links the brake cylinder and exhaust passages, causing the brake cylinder to vent to atmosphere. The spool member remains locked in the released position until the pressure in the control chamber is vented via the brake control passage. The venting of the control chamber then enables the reset spring to reset the spool member to the deactivated position. The control valve assembly has a release lever, a lifter assembly and a lifter spring. The lifter spring biases the lifter assembly into a closed position wherein the supply channel is cut-off from the release passage. When operated, the release lever forces the lifter assembly into an open position wherein the supply channel communicates with the control valve housing. This allows air from the reservoir to flow to the spool valve housing through the release passage. It also allows the air from the reservoir to flow past the control valve assembly to atmosphere. The release valve apparatus can thus be used not only to manually release the pressure in the brake cylinder after a brake application but also to lock the brake cylinder in a release state until pressure in the control chamber is vented via the brake control passage.

In accordance with an aspect of the invention, a plurality of annular flanges is formed around the spool member. Between each of the annular flanges lies an annular passageway. The annular passageways of the spool member enable the passages of the enclosure to communicate according to the position that the spool member occupies in the spool valve housing. Each annular flange defines an annular groove in which an o-ring is secured to resist leaking between adjacent annular passageways.

In accordance with another aspect of the invention, the lifter assembly includes an auxiliary check valve, an emergency check valve, a lifter member, a first plunger and a second plunger. This lifter assembly is designed to work with a railcar on which at least two reservoirs are disposed. The at least one supply channel will then comprise first and second channels. The first channel connects the auxiliary reservoir with the control valve housing, and the second channel connects the emergency reservoir with the control valve housing. More specifically, the auxiliary check valve is disposed in the first channel between the auxiliary reservoir and the release passage. The emergency check valve lies in the second channel between the emergency reservoir and the release passage. The lifter member is biased by the lifter spring against the release lever to the closed position. The first plunger lies between the auxiliary check valve and the lifter member, and the second plunger lies between the emergency check valve and the lifter member. According to this aspect, the operation of the release lever forces the lifter member against at least one of the plungers to open at least one of the check valves. This allows air from at least one of the reservoirs to flow through the control valve housing and the release passage to the spool valve housing. It also allows the air to flow past the lifter member and release lever to atmosphere, thereby permitting the auxiliary and/or emergency reservoir(s) to vent to atmosphere.

In accordance with yet another aspect of the invention, the release lever includes a base portion and a rod portion. The base portion lies in contact with the lifter member inside the enclosure, with the rod portion extending away from the enclosure. The lifter member has a diameter slightly less than that of the control valve housing providing a clearance therebetween. The base portion defines a vent duct therethrough. By operating the rod portion to hold open the check valves, air from one or both reservoirs is allowed to flow via the clearance and past the base portion of the release lever to atmosphere.

DETAILED DESCRIPTION OF THE INVENTION

FIGS. 1–6 illustrate a presently preferred embodiment of the invention, namely, a release valve apparatus, generally designated 300. FIGS. 1 and 2 show the invention incorporated into the ECP brake equipment of a freight railcar. It should be apparent, however, that the invention may be incorporated into other types of vehicles on which the brake equipment may be configured differently from what is shown and described in this document. The release valve apparatus 300 is presented is in this context not to limit its scope but merely for the sake of clarity and to foster a better understanding of the invention.

FIGS. 1 and 2 show the release valve apparatus 300 bolted or otherwise mounted to the manifold 100 of an electropneumatic portion 63 of an ECP brake control valve. FIGS. 2–6, in particular, show the release valve apparatus 300 as it can be linked through the manifold 100 to the auxiliary reservoir 10, the emergency reservoir 20, the brake cylinder 30, and the solenoid-operated application valves 210 and 220 and release valves 230 and 240 of section 200 of an ECP brake control valve.

As best shown in FIGS. 3–6, the release valve apparatus 300 is preferably implemented in a single enclosure 301. The enclosure 301 defines two valve housings 312 and 316 in which a control valve assembly and a spool valve assembly are respectively housed. The enclosure 301 also defines two supply channels 302A and 302B, a brake cylinder passage 303, an exhaust passage 304, a brake control passage 305, a control chamber 306, a chamber passage 307, a release passage 308 and an equalizing duct 309.

The release valve apparatus 300 is internally arranged so that certain channels and passages in the enclosure 301 align with the appropriate external ports of the manifold 100. More specifically, as shown in FIGS. 2–6, the supply channels 302A and 302B align with the auxiliary and emergency reservoir ports, respectively, of the manifold 100. The brake cylinder passage 303 aligns with the brake cylinder port, and the brake control passage 305 aligns with the brake control port of the manifold 100.

Inside the enclosure 301, supply channel 302A links the control valve housing 312 with the auxiliary reservoir 10. Similarly, supply channel 302B links the housing 312 with the emergency reservoir 20. The brake cylinder passage 303 links the spool valve housing 316 with the brake cylinder 30. The exhaust passage 304 communicates the spool valve housing 316 to atmosphere, and the brake control passage 305 connects the spool valve housing 316 with the solenoid-operated application and release valves 210, 220, 230 and 240. The control chamber 306 communicates with one end of housing 316, and the chamber passage 307 links this control chamber 306 with the middle of the housing 316.

The release passage 308 interconnects the control and spool valve housings. The equalizing duct 309 communicates the opposite end of the spool valve housing 316 to atmosphere.

The spool valve assembly, generally designated 360, includes a spool member 370 and a reset spring 390. The reset spring 390 lies compressed between the spool member 370 and the opposite end of its housing 316. Formed around spool member 370 is a plurality of annular flanges. Between flanges 371 and 372 lies annular passageway 381, and annular passageway 382 lies between flanges 372 and 373. Annular passageway 383 resides between annular flanges 373 and 374. As described in greater detail below, the annular passageways of the spool member 370 enable the passages of enclosure 301 to communicate according to the position that the spool member 370 occupies in spool valve housing 316. Each annular flange defines an annular groove in which an o-ring 380 is secured to resist leaking between adjacent annular passageways.

The control valve assembly, generally designated 320, includes a release lever 330, a lifter assembly 340 and a lifter spring 355. The lifter assembly 340 includes an auxiliary check valve 341A, an emergency check valve 341B, a lifter member 345, a first plunger 348A and a second plunger 348B. Auxiliary check valve 341A is situated in supply channel 302A between the auxiliary reservoir 10 and release passage 308. Emergency check valve 341B lies in supply channel 302B between the emergency reservoir 20 and release passage 308. Each check valve may take the form of a resilient disk that is biased against its corresponding valve seat by a spring.

The lifter member 345 is preferably cylindrical with a generally cone-shaped tip at one end. In addition, the lifter member 345 has an outer diameter that is slightly less than the diameter of the control valve housing 312 in which it is disposed. This provides a clearance between the two. The lifter spring 355 lies in compression between a spring seat 317 formed in the control valve housing 312 and the bottom of a bore formed inside the lifter member 345. As best shown in FIGS. 3–6, the first plunger 348A lies between the other or base end of the cylinder and the disk of the auxiliary check valve 341A. Similarly, the second plunger 348B lies between the base end of the cylinder and the disk of the emergency check valve 341B.

The release lever 330 features a rod portion 331 and a base portion 332. The base portion 332 defines one or more vent ducts 334 therethrough. A flange 333 formed on the enclosure 301 retains the base portion 332 inside the enclosure. Urged by the lifter spring 355, the cone-shaped tip of lifter member 345 forces the base portion 332 of release lever 330 against the flange 333. The lifter spring 355 thus biases the lifter assembly 340 into a closed position wherein both supply channels 302A and 302B are cut-off from said control valve housing 312. The rod portion 331 of the lever extends away from the enclosure 301. As explained below, a railroad worker can manipulate the rod portion 331 of the lever 330 to operate the release valve apparatus 300.

Figure 3:
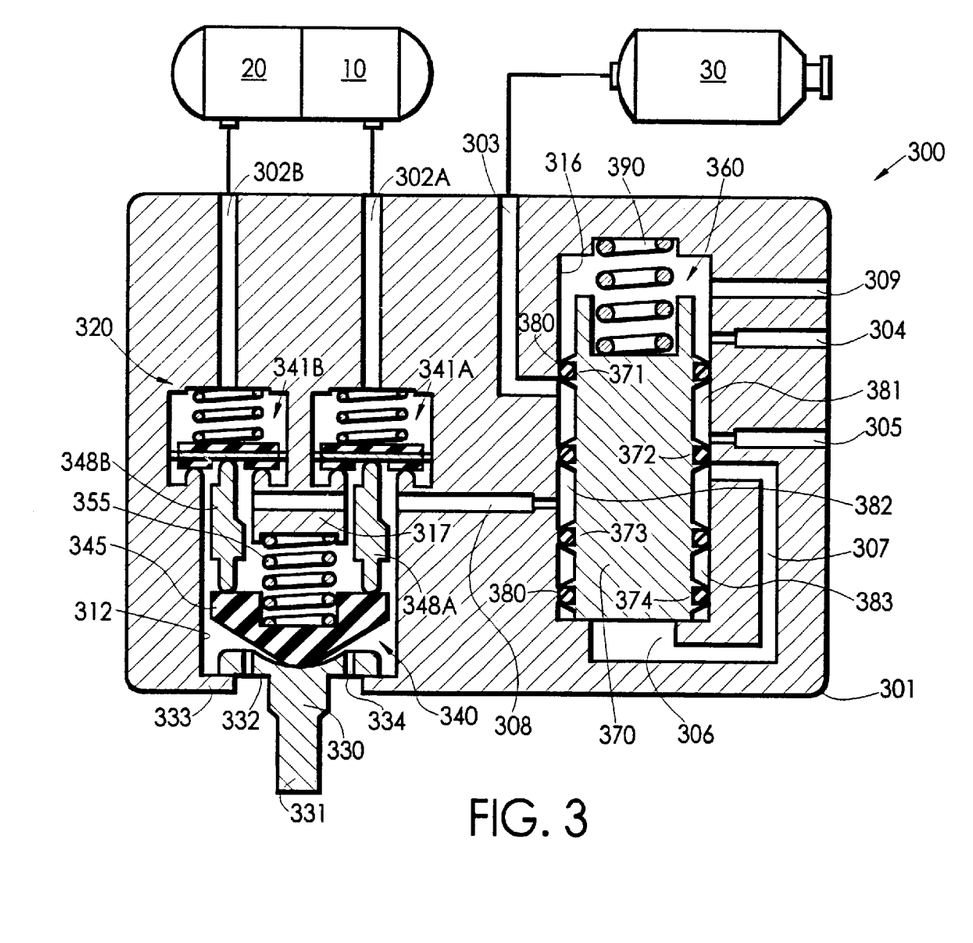
FIG. 3 illustrates the release valve apparatus of FIGS. 1 and 2 in the deactivated position.

The release valve apparatus 300 essentially has five stages of operation: (1) normal; (2) actuation; (3) impending lock-up; (4) lock-up; and (5) reset. FIG. 3 illustrates the release valve apparatus 300 in the normal stage of operation. The bias of the reset spring 390 holds the spool member 370 at the bottom of the spool valve housing 316, i.e., in the deactivated position. In this position, the spool member 370 interconnects the brake control passage 305 and the brake cylinder passage 303 through annular passageway 381. This allows the pressure in the brake cylinder 30 to be controlled only through the brake control passage 305, specifically by the solenoid-operated application and release valves 210, 220, 230 and 240 of an ECP brake control valve. In the deactivated position, the spool member 370 also links the chamber and release passages 307 and 308 via passageway 382. This allows the pressure in the control chamber 306 to be controlled by the control valve assembly 320, in particular by manipulating the rod portion 331 of the release lever 330.

As long as the release lever 330 remains unmoved, the control valve assembly 320 will prevent the air inside the reservoirs 10 and 20 from reaching the release passage 308. Even with the spool member 370 in the deactivated position, no air can therefore reach the control chamber 306. More specifically, absent movement of the lever 330, the lifter spring 355 holds the lifter member 345 against the base portion 332 of lever 330, and the base portion 332 of lever 330 against the flange 333. With the lifter member 345 held in this closed position, the plungers 348A and 348B are drawn downward, which in turn enables the auxiliary and emergency check valves 341A and 341B to be held closed by the force of their respective biasing springs. With the check valves 341A and 341B closed, the auxiliary and emergency reservoirs 10 and 20 are cut off from reservoir passage 308, preventing air from reaching the control chamber 306 via passageway 382 and chamber passage 307.

While the release valve apparatus 300 is functioning in the normal stage of operation, air can flow freely around the spool member 370 between the solenoid valves 210, 220, 230 and 240 of an ECP brake control valve and the brake cylinder 30. Should air in either the brake control passage 305 or the brake cylinder passage 303 leak past the o-rings 380 of the spool member 370, it will not adversely affect the operation of the spool valve assembly 360. In particular, whatever air that leaks past the o-rings 380 into the control chamber 306 will be vented out the vent duct(s) 334 to atmosphere via the chamber passage 307, the release passage 308 and the clearance between the lifter member 345 and the housing 312. Similarly, any air that leaks past the o-rings 380 into the opposite end of the spool valve housing 316 will vent to atmosphere via the equalizing duct 309. Together, the vent duct(s) 334 and the equalizing duct 309 avoid unintended movement of the spool member 370 in the spool valve housing 316.

Figure 4:
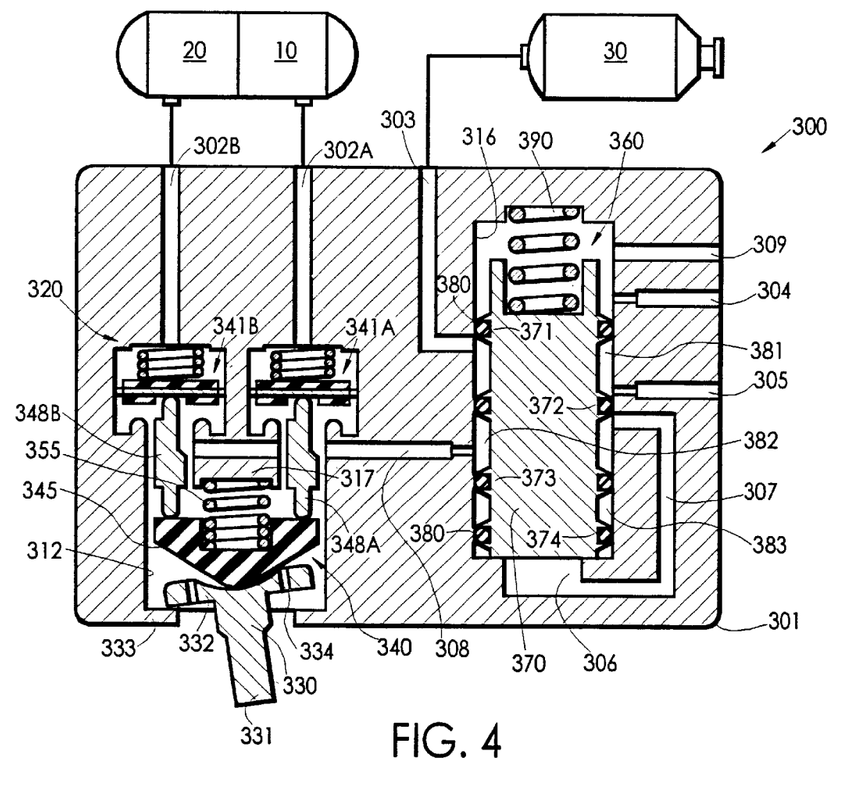
FIG. 4 illustrates the release valve apparatus of FIGS. 1 and 2 as it is being actuated.

FIG. 4 illustrates the release valve apparatus 300 in the actuation stage of operation. After an emergency or service application of the brakes, the brake cylinder 30 may be vented manually by moving the release lever 330. When moved, the release lever 330 pushes the lifter member 345 upward, as shown in FIG. 4, which in turn pushes the plungers 348A and 348B upward. This lifts the check valves 341A and 341B off their respective valve seats, further compressing their respective biasing springs. Air from the auxiliary and emergency reservoirs 10 and 20 then flows through supply channels 302A and 302B deeper into the control valve housing 312. Some of this air will vent around and out the vent duct(s) 334 to atmosphere via the chamber passage 307, the release passage 308 and the clearance between lifter member 345 and housing 312. The slight size of the clearance, however, causes a buildup of air that is ported via release passage 308 to the spool valve assembly 360. With the spool member 370 initially in the deactivated position, this air flows into the control chamber 306 via annular passageway 382 and chamber passage 307.

Figure 5:
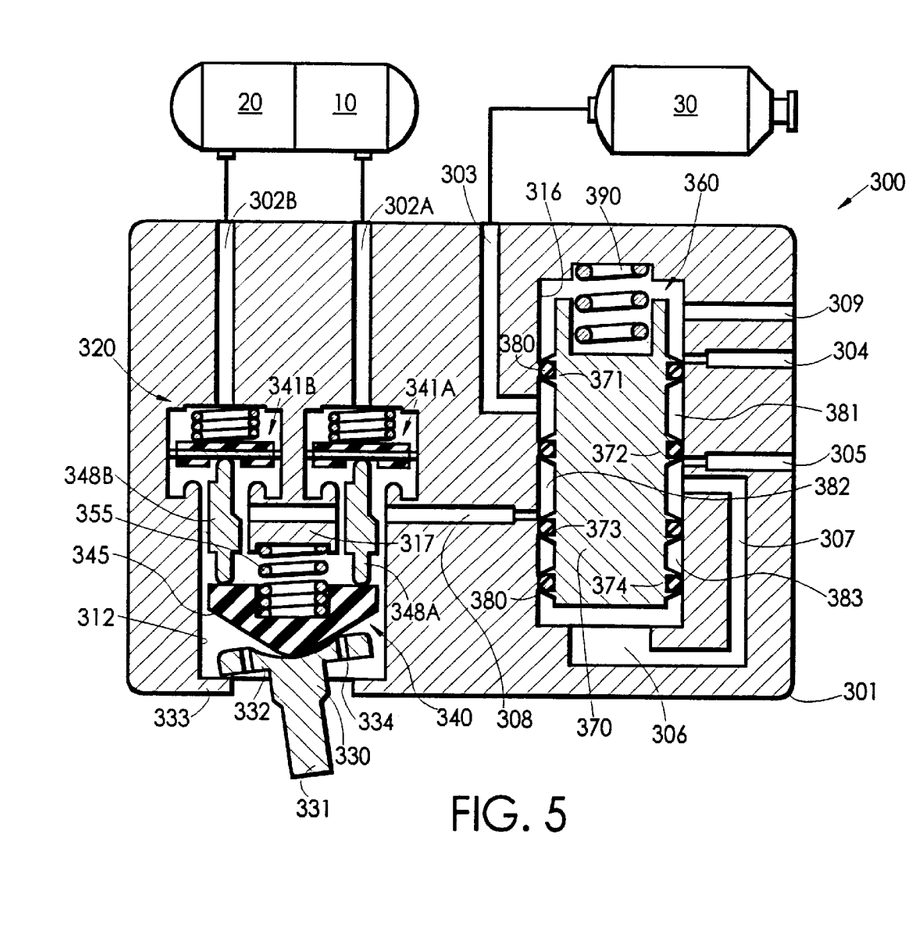
FIG. 5 illustrates the release valve apparatus of FIGS. 1 and 2 just before the spool member assumes the released position.

FIG. 5 shows the release valve apparatus 300 in the impending lock-up stage of operation, which follows the actuation stage. The spool member 370 responds to the build up of pressure in the control chamber 306 by moving upward, out of the deactivated position. Movement of the spool member 370 first carries annular passageway 381 upward, disconnecting it from brake control passage 305 and the solenoid valves 210, 220, 230 and 240. At this point, the brake cylinder 30 is isolated from both the brake control passage 305 and the exhaust passage 304.

Once the spool member 370 moves beyond the point at which the annular flange 372 passes the brake control passage 305, it interconnects the brake control passage 305 and the chamber passage 307 via annular passageway 382. In this position and with the release lever 330 still being operated, the spool member 370 allows pressure to be built in the control chamber 306 via both the release passage 308 and the brake control passage 305. The control chamber 306 now receives air not only from the auxiliary and emergency reservoirs 10 and 20 but also from the solenoid-operated application valves 210 and 220 that are energized or were previously energized. As shown in FIG. 5, the spool member 370 has not yet moved upward enough to carry annular passageway 381 to interconnect the brake cylinder and exhaust passages 303 and 304.

Figure 6:
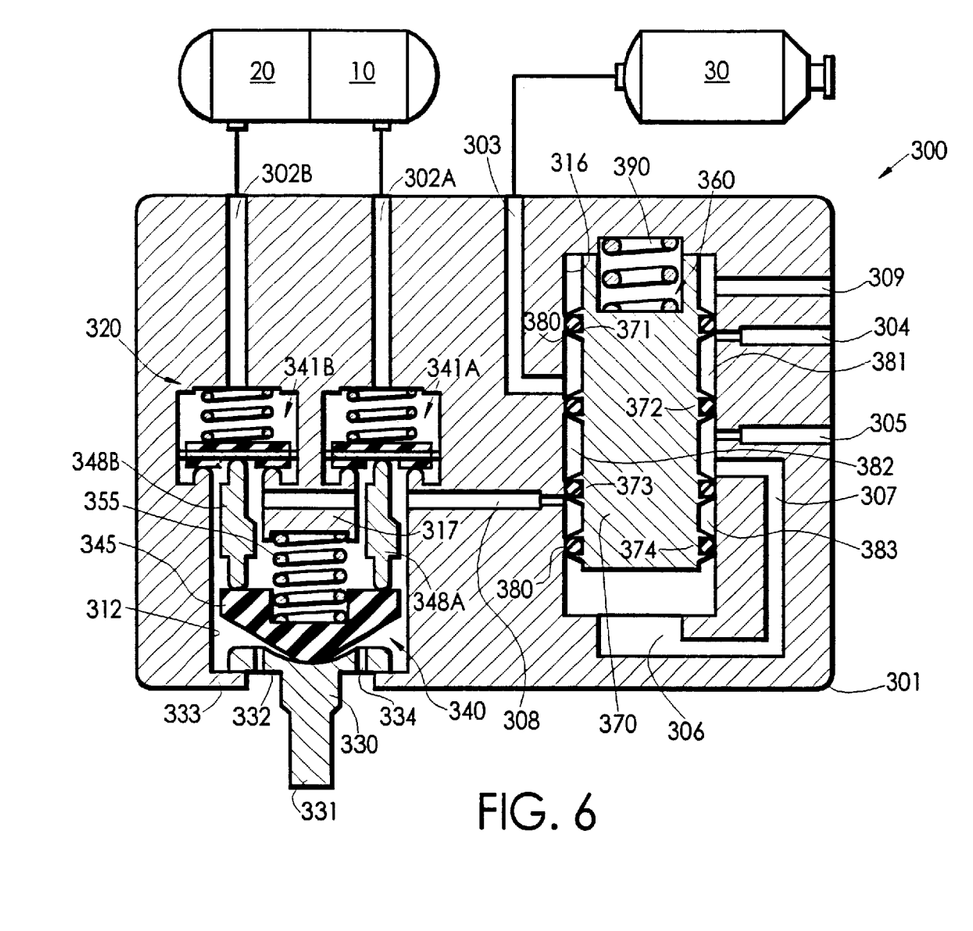
FIG. 6 shows the release valve apparatus of FIGS. 1 and 2 with the spool member in the released position.

FIG. 6 shows the release valve apparatus 300 in the lock-up stage of operation, which follows the impending lock-up stage. Specifically, the continuing pressure buildup in the control chamber 306 quickly moves the spool member 370 to the released position. Here, the spool member has carried annular flange 373 beyond release passage 308 thereby disconnecting the release and chamber passages 308 and 307. Air from the auxiliary and emergency reservoirs 10 and 20 can no longer reach the control chamber 306. If venting of the brake cylinder 30 is all that is to be done, the release lever 330 can therefore be released, as it is no longer needed to achieve that objective. This is because the brake control passage 305 remains linked to chamber passage 307 via passageway 382. The control chamber 306 thus receives air only from those application valves 210 and 210 of the ECP brake control valve that are energized or were previously energized.

In the released position, the spool member 370 has also carried annular flange 371 beyond the exhaust passage 304. This allows the brake cylinder 30 to vent to atmosphere through brake cylinder passage 303, annular passageway 381 and exhaust passage 304. It is anticipated that the release lever 330 need be operated for only 3 seconds, approximately, for the spool member 370 to become locked in the released position. This lock-up feature thus allows a railroad worker to vent the brake cylinder 30 merely by momentarily pulling on the release lever 330.

By using the release lever 330 to hold open the check valves 341A and 341B, a railroad worker can not only vent the brake cylinder 30 but also blow down the auxiliary and emergency reservoirs 10 and 20. The air from the reservoirs 10 and 20 will flow through supply channels 302A and 302B past the check valves 341A and 341B, the plungers 348A and 348B, and the lifter member 345 to the bottom of the control valve housing 320. The air will escape to atmosphere out of the gap between the base portion 332 of lever 330 and the flange 333 of enclosure 301 caused by the sustained pull on the release lever 330.

By viewing FIGS. 3 and 6 in reverse order, it can also be ascertained how the release valve apparatus 300 operates in the reset stage of operation. The spool member 370 will remain locked in the released position, as shown in FIG. 6, until the pressure in the control chamber 306 is vented. This can be done by energizing the solenoid-operated release valves 230 and 240 of the ECP brake control valve. The bulk of the air in the control chamber 306 would vent to atmosphere through the solenoid valve(s) via chamber passage 307 and brake control passage 305. Once the reset spring 390 pushes the spool member 370 below the point at which the annular flange 372 cuts off the brake control passage 305 from the chamber passage 307, the release passage 308 will have already been interconnected to chamber passage 307. Whatever air that remains in control chamber 306 will be vented out the vent duct(s) 334 to atmosphere via the chamber passage 307, the release passage 308 and the clearance between the lifter member 345 and the control valve housing 312. The venting of the control chamber 306 thus enables the reset spring 390 to reset the spool member 370 to the deactivated position.

As an optional feature, the lifter member 345 and both of the plungers 348A and 348B may be fluted. This would aid the flow of air through the control valve housing 320.

The presently preferred embodiment for carrying out the invention has been set forth in detail according to the Patent Act. Persons of ordinary skill in the art to which this invention pertains may nevertheless recognize various alternative ways of practicing the invention without departing from the spirit and scope of the following claims. Persons who possess such skill will also recognize that the foregoing description is merely illustrative and not intended to limit any of the following claims to any particular narrow interpretation.

Accordingly, to promote the progress of science and the useful arts, I secure for myself by Letters Patent exclusive rights to all subject matter embraced by the following claims for the time prescribed by the Patent Act.

I claim:

1. A release valve apparatus for manually releasing pressure from a brake cylinder of a railcar, said railcar also having at least one reservoir and an electropneumatic valve used in controlling the pressure developed within said brake cylinder, said release valve apparatus comprising:

(a) an enclosure defining a control valve housing in which a control valve assembly is disposed and a spool valve housing in which a spool valve assembly is disposed, said enclosure also defining (i) at least one supply channel for connecting said reservoir with said control valve housing, (ii) a brake cylinder passage for connecting said brake cylinder with said spool valve housing, (iii) an exhaust passage communicating said spool valve housing to atmosphere, (iv) a brake control passage for connecting said electropneumatic valve with said spool valve housing, (v) a control chamber communicating with one end of said spool valve housing, (vi) a chamber passage further linking said control chamber with said spool valve housing, and (vii) a release passage interconnecting said control and said spool valve housings;

(b) said spool valve assembly comprising a reset spring and a spool member the position of which in said spool valve housing dictates communication between said passages, said reset spring biasing said spool member to a deactivated position wherein (I) said brake control and said brake cylinder passages communicate thereby permitting pressure in said brake cylinder to be controlled via said brake control passage and (II) said chamber and said release passages communicate thereby permitting only said control valve assembly to control pressure in said control chamber; said spool member responsive to build up of pressure in said control chamber by moving (I) away from said deactivated position to switch said brake control passage from communication with said brake cylinder passage to communication with said chamber passage thereby enabling pressure to be built in said control chamber via both said brake control passage and said release passage and (II) then to a released position wherein said release passage is cutoff from said chamber passage thereby enabling pressure in said control chamber to be controlled only through said brake control passage and wherein said brake cylinder passage is connected to said exhaust passage thereby enabling said brake cylinder to vent to atmosphere; said spool member being locked in said released position until pressure in said control chamber is vented via said brake control passage upon occurrence of which said reset spring resets said spool member to said deactivated position; and (c) said control valve assembly having a release lever, a lifter assembly and a lifter spring; said lifter spring biasing said lifter assembly into a closed position wherein said supply channel is cut-off from said control valve housing; said release lever when operated forces said lifter assembly into an open position wherein said supply channel communicates with said control valve housing thereby allowing air from said reservoir to flow past said control valve assembly to atmosphere and to said spool valve housing through said release passage.

2. The release valve apparatus claimed in claim 1 wherein:

(a) said reset spring lies compressed between an opposite end of said spool valve housing and said spool member; and (b) said enclosure defines an equalizing duct communicating said opposite end of said spool valve housing to atmosphere.

3. The release valve apparatus claimed in claim 2 wherein:

(a) said spool member has a plurality of annular flanges therearound between each of which lie an annular passageway, said annular passageways of said spool member enabling said passages in said enclosure to communicate according to the position of said spool member in said spool valve housing; and (b) each of said annular flanges defines an annular groove in which an o-ring is secured to resist leaking between adjacent said annular passageways.

4. The release valve apparatus claimed in claim 3 wherein said at least one reservoir includes an auxiliary reservoir and an emergency reservoir, said at least one supply channel comprises first and second channels such that said first channel connects said auxiliary reservoir with said control valve housing and said second channel connects said emergency reservoir with said control valve housing, and said lifter assembly includes:

(a) an auxiliary check valve disposed in said first channel between said auxiliary reservoir and said release passage;

(b) an emergency check valve disposed in said second channel between said emergency reservoir and said release passage;

(c) a lifter member biased by said lifter spring against said release lever to said closed position;

(d) a first plunger situated between said auxiliary check valve and said lifter member; and (e) a second plunger situated between said emergency check valve and said lifter member;

such that operation of said release lever forces said lifter member and at least one of said plungers therewith to open at least one of said check valves thereby allowing air from at least one of said reservoirs to flow through said control valve housing past said lifter member and said release lever to atmosphere and to said spool valve housing through said release passage.

5. The release valve apparatus claimed in claim 4 wherein said release lever comprises:

(a) a base portion situated in contact with said lifter member inside said enclosure; and (b) a rod portion extending away from said enclosure.

6. The release valve apparatus claimed in claim 5 wherein the diameter of said lifter member is slightly less than the diameter of said control valve housing thereat to provide a clearance therebetween.

7. The release valve apparatus claimed in claim 6 wherein said base portion of said release lever defines a vent duct therethrough.

8. The release valve apparatus claimed in claim 6 wherein said lifter member is fluted.

9. The release valve apparatus claimed in claim 8 wherein said first and said second plungers are fluted.

10. The release valve apparatus claimed in claim 7 wherein said lifter member is fluted and said first and said second plungers are fluted.

11. A release valve apparatus for manually releasing pressure from a brake cylinder of a railcar, said railcar also having at least one reservoir and electropneumatic valves used in controlling the pressure developed within said brake cylinder, said release valve apparatus comprising:

(a) an enclosure defining a control valve housing in which a control valve assembly is disposed and a spool valve housing in which a spool valve assembly is disposed, said enclosure also defining (i) at least one supply channel for connecting said reservoir with said control valve housing, (ii) a brake cylinder passage for connecting said brake cylinder with said spool valve housing, (iii) an exhaust passage communicating said spool valve housing to atmosphere, (iv) a brake control passage for connecting said electropneumatic valves with said spool valve housing, (v) a control chamber communicating with one end of said spool valve housing, (vi) a chamber passage further linking said control chamber with said spool valve housing, and (vii) a release passage interconnecting said control and said spool valve housings;

(b) said spool valve assembly comprising a reset spring and a spool member the position of which in said spool valve housing dictates communication between said passages, said reset spring biasing said spool member against said one end of said spool valve housing to a deactivated position wherein (I) said brake control and said brake cylinder passages communicate thereby permitting said electropneumatic valves to control pressure developed in said brake cylinder and (II) said chamber and said release passages communicate thereby permitting only said control valve assembly to control pressure in said control chamber; said spool member responsive to build up of pressure in said control chamber by moving (I) away from said deactivated position to switch said brake control passage from communication with said brake cylinder passage to communication with said chamber passage thereby enabling pressure to be built in said control chamber via both said brake control passage and said release passage and (II) then to a released position wherein said release passage is cutoff from said chamber passage thereby enabling pressure in said control chamber to be controlled only by said electropneumatic valves and wherein said brake cylinder passage is connected to said exhaust passage thereby enabling said brake cylinder to vent to atmosphere; said spool member being locked in said released position until pressure in said control chamber is vented through said electropneumatic valves upon occurrence of which said reset spring resets said spool member to said deactivated position; and (c) said control valve assembly having a release lever, a lifter assembly and a lifter spring; said lifter spring biasing said lifter assembly into a closed position wherein said supply channel is cut-off from said control valve housing; said release lever when operated forces said lifter assembly into an open position wherein said supply channel communicates with said control valve housing thereby allowing air from said reservoir to flow past said control valve assembly to atmosphere and to said spool valve housing through said release passage.

12. The release valve apparatus claimed in claim 11 wherein:

(a) said reset spring lies compressed between an opposite end of said spool valve housing and said spool member; and (b) said enclosure defines an equalizing duct communicating said opposite end of said spool valve housing to atmosphere.

13. The release valve apparatus claimed in claim 12 wherein:

(a) said spool member has a plurality of annular flanges therearound between each of which lie an annular passageway, said annular passageways of said spool member enabling said passages in said enclosure to communicate according to the position of said spool member in said spool valve housing; and (b) each of said annular flanges defines an annular groove in which an o-ring is secured to resist leaking between adjacent said annular passageways.

14. The release valve apparatus claimed in claim 13 wherein said at least one reservoir includes an auxiliary reservoir and an emergency reservoir, said at least one supply channel comprises first and second channels such that said first channel connects said auxiliary reservoir with said control valve housing and said second channel connects said emergency reservoir with said control valve housing, and said lifter assembly includes:

(a) an auxiliary check valve disposed in said first channel between said auxiliary reservoir and said release passage;

(b) an emergency check valve disposed in said second channel between said emergency reservoir and said release passage;

(c) a lifter member biased by said lifter spring against said release lever to said closed position;

(d) a first plunger situated between said auxiliary check valve and said lifter member; and (e) a second plunger situated between said emergency check valve and said lifter member;

such that operation of said release lever forces said lifter member and at least one of said plungers therewith to open at least one of said check valves thereby allowing air from at least one of said reservoirs to flow through said control valve housing past said lifter member and said release lever to atmosphere and to said spool valve housing through said release passage.

15. The release valve apparatus claimed in claim 14 wherein said release lever comprises:

(a) a base portion situated in contact with said lifter member inside said enclosure; and (b) a rod portion extending away from said enclosure.

16. The release valve apparatus claimed in claim 15 wherein the diameter of said lifter member is slightly less than the diameter of said control valve housing thereat to provide a clearance therebetween.

17. The release valve apparatus claimed in claim 16 wherein said base portion of said release lever defines a vent duct therethrough.

18. The release valve apparatus claimed in claim 17 wherein said lifter member is fluted.

19. The release valve apparatus claimed in claim 18 wherein said first and said second plungers are fluted.

* * * * *